(12) United States Patent
Haijima et al.

(10) Patent No.: US 6,688,009 B2
(45) Date of Patent: Feb. 10, 2004

(54) LASER SURVEY INSTRUMENT

(75) Inventors: Yasuhito Haijima, Tokyo-to (JP); Takaaki Yamazaki, Tokyo-to (JP)

(73) Assignee: Kabushiki Kaisha Topcon, Tokyo-to (JP)

(*) Notice: Subject to any disclaimer, the term of this patent is extended or adjusted under 35 U.S.C. 154(b) by 0 days.

(21) Appl. No.: 09/814,030

(22) Filed: Mar. 21, 2001

(65) Prior Publication Data

US 2001/0025425 A1 Oct. 4, 2001

(30) Foreign Application Priority Data

Mar. 29, 2000 (JP) ........................................ 2000-091371

(51) Int. Cl.$^7$ ................................................. G01C 1/02
(52) U.S. Cl. .............................. 33/281; 33/283; 33/290; 33/1 PT
(58) Field of Search ........................... 33/281, 282, 285, 33/286, 290, 291, 292, DIG. 21, 283, 1 N, 1 PT

(56) References Cited

U.S. PATENT DOCUMENTS

| | | | | |
|---|---|---|---|---|
| 4,988,192 A | * | 1/1991 | Knittel | 33/281 |
| 5,216,480 A | * | 6/1993 | Kaneko et al. | 356/139.06 |
| 5,421,096 A | * | 6/1995 | Ross | 33/290 |
| 5,485,266 A | | 1/1996 | Hirano et al. | 356/249 |
| 5,539,990 A | * | 7/1996 | Le | 33/281 |
| 5,589,939 A | * | 12/1996 | Kitajima | 356/622 |
| 5,907,907 A | * | 6/1999 | Ohtomo et al. | 33/281 |
| 5,946,087 A | * | 8/1999 | Kasori et al. | 356/249 |
| 5,983,510 A | * | 11/1999 | Wu et al. | 33/286 |
| 6,073,353 A | * | 6/2000 | Ohtomo et al. | 33/DIG. 21 |
| 6,137,569 A | * | 10/2000 | Sasaki et al. | 356/153 |
| 6,151,106 A | * | 11/2000 | Ohtomo et al. | 356/4.08 |
| 6,163,373 A | * | 12/2000 | Ohtomo et al. | 356/147 |
| 6,253,457 B1 | * | 7/2001 | Ohtomo et al. | 33/281 |
| 6,453,569 B1 | * | 9/2002 | Kumagai et al. | 33/281 |
| 2002/0028016 A1 | * | 3/2002 | Gotoh | 382/181 |
| 2002/0138997 A1 | * | 10/2002 | Ohtomo et al. | 33/290 |

* cited by examiner

Primary Examiner—Diego Gutierrez
Assistant Examiner—Yaritza Guadalupe
(74) Attorney, Agent, or Firm—Nields & Lemack

(57) ABSTRACT

A laser survey instrument, comprising a laser projector for projecting a laser beam onto a plane by rotary irradiation, a tilting unit for tilting the laser projector in two directions running perpendicularly each other and a tilt setting unit for setting a desired tilt angle for the laser projector at least in one direction, wherein the tilt setting unit comprises a tilt sensor for detecting a horizontal position and an angle detector for detecting an angle between the tilt sensor and the laser projector.

2 Claims, 8 Drawing Sheets

LASER SURVEY INSTRUMENT

BACKGROUND OF THE INVENTION

The present invention relates to a laser survey instrument, which can project a laser beam at an arbitrary tilt angle to a horizontal plane.

A type of laser survey instrument is already known, which can form a horizontal reference line by a laser beam by projecting the laser beam in a horizontal direction, or which projects the laser beam by rotary scanning and forms a horizontal reference plane by the laser beam. As one of the laser survey instruments of this type, a survey instrument is concretely realized, which not only projects the laser beam in the horizontal direction but also can project the laser beam at any desired tilt angle with the horizontal plane as reference.

Referring to FIG. 5 to FIG. 7, description will be given below on a conventional type laser survey instrument, which can tilt the projecting direction of the laser beam at any desired angle.

At the center of a casing 5, a recessed portion 6 in form of a truncated cone is provided, and a support seat 7 is arranged at the center of the recessed portion 6. The support seat 7 is provided with a circular bore 8 formed on the recessed portion 6, and projections 9 are smoothly projected in three-dimensional curved surface and are arranged at three positions equally spaced on inner periphery of the bore 8.

A laser projector 10 for emitting a laser beam is placed into the bore 8, and a head 11 of the laser projector 10 is engaged with and supported by the support seat 7. The lower portion of the head 11 is designed in a spherical shape, and this spherical portion 11a slidably contacts the three projections 9. The laser projector 10 is supported in such manner that it can be tilted in any direction with respect to the vertical line.

On the head 11, a motor seat 14 extending in a horizontal direction is provided. A scanning motor 15 is mounted on the motor seat 14, and a gear 16 is attached on an output shaft of the scanning motor 15. The gear 16 is engaged with a scanning gear 17 as described later.

On the head 11 of the laser projector 10, a prism holder 13 is rotatably mounted via a bearing 12 on the axis of the laser projector 10. The scanning gear 17 is attached on the prism holder 13, and the scanning gear 17 is engaged with the gear 16 as already explained. By the scanning motor 15, the prism holder 13 is rotated around the vertical axis. The prism holder 13 and the scanning gear 17 make up together a rotator 3. A pentagonal prism 18 is provided on the prism holder 13, and the laser beam emitted from the laser projector 10 is deflected and projected in the horizontal direction through a projection window 19.

In the middle portion of the laser projector 10, a sensor support shelf 63 is mounted in a direction perpendicularly crossing the optical axis of the laser projector 10. On the sensor support shelf 63, fixed bubble tubes 20 and 21, serving as tilt detectors for detecting the horizontal position, are arranged so that these bubble tubes cross perpendicularly each other. The fixed bubble tubes 20 and 21 are electric bubble tubes of capacitance detection type, and each of the bubble tubes outputs an electric signal corresponding to a tilt angle with the horizontal plane as reference.

On the lower portion of the laser projector 10, there is provided a tilt angle setting unit 74. The tilt angle setting unit 74 comprises arbitrary angle setting bubble tubes 65 and 66, and these bubble tubes are arranged at positions opposite to the fixed bubble tubes 20 and 21 respectively.

At the lower end of the laser projector 10, a base plate 64 is fixed, which is approximately in shape of a right-angled triangle. A support column 70 is erected at a position near a vertex of the right-angled triangle of the base plate 64, and a ball 67 is fixed on the upper end of the column 70. A tilting base plate 62 in L-shaped rectangular form is arranged above the base plate 64. A conical recessed portion 99 is formed at a vertex of L-shaped rectangle on the back side of the tilting base plate 62. The ball 67 is engaged in the recessed portion 99. The column 70 pivotally supports the vertex of the tilting base plate 62 via the ball 67, and the tilting base plate 62 can be pivotally moved on the ball 67. Further, a spring 68 is provided between the tilting base plate 62 and the base plate 64. This spring presses the conical recessed portion 99 against the ball 67 and pushes the tilting base plate 62 clockwise as seen in FIG. 5.

On the tilting base plate 62, the arbitrary angle setting bubble tubes 65 and 66, serving as tilt detectors, are placed along lines, which cross perpendicularly each other along the L-shape.

A bearing support plate 72 is disposed below the sensor support shelf 63. The bearing support plate 72 is projected in the horizontal direction from the laser projector 10. Tilting screws 52 and 53 are rotatably mounted at such positions that these two screws form a triangle with the column 70 as a vertex on the base plate 64. Upper end of each of the tilting screws 52 and 53 is rotatably and pivotally supported on the bearing support plate 72.

The lower end of the tilting screw 52 is protruded downward from the base plate 64. A tilting gear 54 is attached on the protruded lower end of the tilting screw 52, and the tilting gear 54 is engaged with a tilting gear 56 as described later. The lower end of the tilting screw 53 is protruded downward from the base plate 64. A tilting gear 55 is attached on the protruded end of the tilting screw 53. The tilting gear 55 is engaged with a tilting gear 57 as described later.

A tilting nut 48 is screwed on the tilting screw 52, and a nut pin 50 with circular cross-section is mounted on the tilting nut 48 in the horizontal direction. From an end surface of the tilting base plate 62 closer to the arbitrary angle setting bubble tube 65, a tilting pin 60 with circular cross-section is protruded in a direction parallel to the central line of the arbitrary angle setting bubble tube 65, and the tilting pin 60 is in contact with the nut pin 50. Further, two parallel guide pins 71 are run between the base plate 64 and the bearing support plate 72. The tilting pin 60 is slidably supported by the two guide pins 71, and the rotation of the tilting base plate 62 in the horizontal direction is restricted. Also, it is allowed only to rotate in the up-to-bottom direction of the tilting pin 60 and to rotate around the axis of tilting pin 60.

A tilting nut 49 is screwed on the tilting screw 53, and a nut pin 51 with circular cross-section is mounted on the tilting nut 49. From an end surface of the tilting base plate 62 closer to the arbitrary angle setting bubble tube 66, a tilting pin 61 with circular cross-section is protruded in a direction parallel to the central line of the arbitrary angle setting bubble tube 66, and the tilting pin 61 is brought into contact with the nut pin 51.

A pedestal column 73 is attached vertically on the lower surface of the base plate 64, and a tilt detector 23, which also serves as a motor base, is fixed via the pedestal column 73.

On the upper surface of the tilt detector 23, tilt angle setting motors 58 and 59, i.e. pulse motors, are mounted. The tilting gear 56 is engaged with an output shaft of the tilt angle setting motor 58. The tilting gear 57 is engaged with an output shaft of the tilt angle setting motor 59, and these tilting gears are engaged with the tilting gears 54 and 55 respectively.

On the lower surface of the tilt detector 23, a ring-like reflection mirror (not shown) is attached. Optical sensors 24a, 24b, 24c and 24d (24b and 24d are not shown) comprising four pairs of light emitting element and photo-detection element are arranged on a bottom of the casing 5. The optical sensors 24a, 24b, 24c and 24d are disposed at positions facing to the tilt detector 23, and on the same circumference around the axis of the laser projector 10 when both the casing 5 and the laser projector 10 are at vertical position.

In the following, description will be given on a tilting unit for tilting the laser projector 10 in any arbitrary direction.

From the head 11 of the laser projector 10, tilt arms 25 and 26 are extended in two different horizontal directions perpendicularly crossing each other, and these arms are passed through the conical surface of the recessed portion 6 and are positioned within the casing 5. On the forward end of each of the tilt arms 25 and 26, engaging pins 27 and 28 are arranged to protrude from the end respectively. The engaging pins 27 and 28 are designed in cylindrical shape. Axes of the cylinders cross perpendicularly each other, and the positions are determined in such manner that these are included in a plane passing through the center of the spherical portion 11a. With respect to one of these two engaging pins 27 and 28, e.g. to the engaging pin 27, the movement in the horizontal direction is restricted, and it is allowed to move only in the vertical direction.

Shelf plates 29 and 30 are provided on inner wall of the casing 5. A tilting motor 31 is provided on the shelf plate 29, and a tilting motor 32 is arranged on the shelf plate 30. A driving gear 33 is engaged on the rotation shaft of the tilting motor 31, and a driving gear 34 is engaged on the rotation shaft of the tilting motor 32. A screw shaft 35, which runs perpendicularly to the engaging pin 27 and reaches a ceiling of the casing 5 and the shelf plate 29, is rotatably mounted. A driven gear 36 is attached on the screw shaft 35, and the driven gear 36 is engaged with the driving gear 33. A slide nut 37 is screwed on the screw shaft 35, and a pin 38 is protruded from the slide nut 37. The pin 38 and the engaging pin 27 are brought into contact so that these can slide with respect to each other.

In similar manner, a screw shaft 39, which runs perpendicularly to the engaging pin 28 and reaches a ceiling of the casing 5 and the shelf plate 30, is rotatably mounted. A driven gear 40 is attached on the screw shaft 39, and the driven gear 40 is engaged with the driving gear 34. A slide nut 41 is screwed on the screw shaft 39, and a pin 42 is protruded from the slide nut 41. The pin 42 and the engaging pin 28 are brought into contact with each other so that these can slide with respect to each other.

A spring receiver 43 is provided on the ceiling of the casing 5 and between the screw shafts 35 and 39. A spring 44 is stretched between the spring receiver 43 and the laser projector 10 so that a force is applied on the laser projector 10 to move it clockwise around the support seat 7 as seen in FIG. 5.

In the figure, reference numeral 45 denotes a battery box to accommodate a battery for driving the laser survey instrument. A main unit of the laser survey instrument is placed on a tripod (not shown) via a leveling bolt 46 for leveling purpose. Reference numeral 47 represents a glass window which encloses the periphery of the prism holder 13.

Referring to FIG. 8, description will be given on operation to tilt the projecting direction of the laser beam in the conventional type laser survey instrument as described above.

A tilt value is inputted to a tilt control unit (not shown).

Based on the results of detection by the fixed bubble tubes 20 and 21, the tilting motor 31 is driven. The laser projector is tilted via the screw shaft 35, the slide nut 37, and the tilt arm 25. Also, the tilting motor 32 is driven, and the laser projector 10 is tilted via the screw shaft 39, the slide nut 41, and the tilt arm 26. When the fixed bubble tubes 20 and 21 detect the horizontal position, leveling is performed for the laser projector 10.

Next, the tilt angle setting motors 58 and 59 are driven so that output of each of the arbitrary angle setting bubble tubes 65 and 66 will be identical with output of each of the fixed bubble tubes 20 and 21 respectively. The angle of the tilting base plate 62 is adjusted by adjusting the tilting gear 56, the tilting gear 54, the tilting screw 52, the tilting nut 48, and the nut pin 50, and also by adjusting the tilt angle setting motor 59, the tilting gear 55, the tilting screw 53, and the nut pin 51. As a result, the tilting base plate 62 can be set to the zero position (horizontal position). The horizontal setting of the tilting base plate 62 can also be performed by setting a stopper, etc. to the mechanical zero position, and by touching the base plate on the stopper.

Next, the tilting base plate 62 is tilted to the inputted tilt value. Description will be given now on the setting of the tilting direction detected by the arbitrary angle setting bubble tube 65.

From the condition where the output of each of the arbitrary angle setting bubble tubes 65 and 66 is turned to identical with the output of each of the fixed bubble tubes 20 and 21, the tilt angle setting motor 58 is driven in such number of steps as to correspond to the setting angle, and the tilting base plate 62 is tilted at a setting angle in a direction opposite to the direction, in which the laser projector 10 is to be tilted.

When the tilting base plate 62 is tilted at the setting angle, the tilting motor 31 is driven, and the laser projector 10 is tilted in a direction to be tilted. When the condition is reached where the arbitrary angle setting bubble tube 65 detects the horizontal position, tilt setting for the laser projector 10, i.e. tilting of the laser beam projecting direction at a predetermined angle, is completed.

The tilt setting of the arbitrary angle setting bubble tube 66 can also be performed by the same procedure.

When the pentagonal prism 18 is rotated via the prism holder 13 using the scanning motor 15, a reference plane tilted in a predetermined direction can be formed.

In the conventional type laser survey instrument as described above, tilting of the laser beam is set only by adjusting the feeding amount of the tilting nut 48 according to the amount of rotation of the pulse motor. As a result, the accuracy of the tilt angle setting depends on fabrication accuracy and assembling accuracy of the components such as the tilting screw 52, the tilting nut 48, etc. Therefore, variation occurs in the tilting accuracy due to the variation in fabrication accuracy and assembling accuracy. The difference in thermal expansion due to temperature exerts influence on the accuracy of the tilt setting.

Further, in order to meet the specifications and the standards of the product, strict accuracy is required for each of the components, and this results in the higher manufacturing cost.

As described above, the tilting base plate 62 is tilted, and angle setting is performed. A distance from the contact point of the ball 67 (the center of tilting of the tilting base plate 62) to the contact point of the tilting pin 60 with the nut pin 50 is increased when the base plate 62 is tilted, and an error occurs between the displacement of the tilting nut 48 and the tilt angle of the tilting base plate 62. This can be corrected by calculation based on a correction formula. However, because of the fabrication error and assembling error of the components as described above, the error cannot be corrected simply by the certain correction formula. When the setting tilt is larger, the error will be larger.

Further, in the tilt setting, when it is turned from a certain status to the horizontal position, zero detection is performed to maintain accuracy of the horizontal position. That is, prior to the tilt setting, detection values on the arbitrary angle setting bubble tubes 65 and 66 of the tilting base plate 62 are equalized with those of the fixed bubble tubes 20 and 21. Or, it is touched to a mechanical zero setting point (more concretely, touched to a component such as a stopper), and zero reset is performed. For this reason, zero reset operation must be performed each time the tilt setting is carried out, and this means that longer time is required until the setting procedure is completed. Further, because driving frequency of the tilting nut 48 and the slide nut 37 is higher, and problem arises in the wear between the tilting screw 52 and the tilting nut 48 and between the slide nut 37 and the screw shaft 35.

Also, zero detection is performed using mechanical components such as stopper, and an error also occurs due to the changes of position caused by the temperature of the stopper or the changes of condition caused by wear of the operating part of the components such as tilting nut 48.

Cumulative results of the various errors as described above increase more over the course of time, and unless re-setting is performed at appropriate time, the errors may exert influence on the accuracy of tilt setting of the laser beam.

SUMMARY OF THE INVENTION

It is an object of the present invention to provide a laser survey instrument, for which no strict component accuracy is required and by which it is possible to perform tilt setting for the laser beam projecting direction without causing cumulative errors.

To attain the above object, the present invention provides a laser survey instrument, comprising a laser projector for projecting a laser beam onto a plane by rotary irradiation, a tilting unit for tilting the laser projector in two directions running perpendicularly each other and a tilt setting unit for setting a desired tilt angle for the laser projector at least in one direction, wherein the tilt setting unit comprises a tilt sensor for detecting a horizontal position and an angle detector for detecting an angle between the tilt sensor and the laser projector. Also, the present invention provide a laser survey instrument as described above, wherein the tilting unit can tilt the laser projector in two directions running perpendicularly each other and the tilt setting unit is provided so as to set tilting only in one direction. Further, the present invention provide a laser survey instrument as described above, wherein the tilting unit and the tilt setting unit are provided so as to set tilting in two directions running perpendicularly to each other, the tilting unit comprises a first tilting unit and a second tilting unit, and the tilt setting unit comprises a first tilt setting unit and a second tilt setting unit. Also, the present invention provide a laser survey instrument as described above, wherein the tilting unit comprises a first tilting unit and a second tilting unit provided for two directions crossing perpendicularly each other, and the tilt setting unit is provided on one of the first tilting unit and the second tilting unit, and the tilt sensor for detecting the horizontal position is provided on the other.

DETAILED DESCRIPTION OF THE INVENTION

Figure 1:
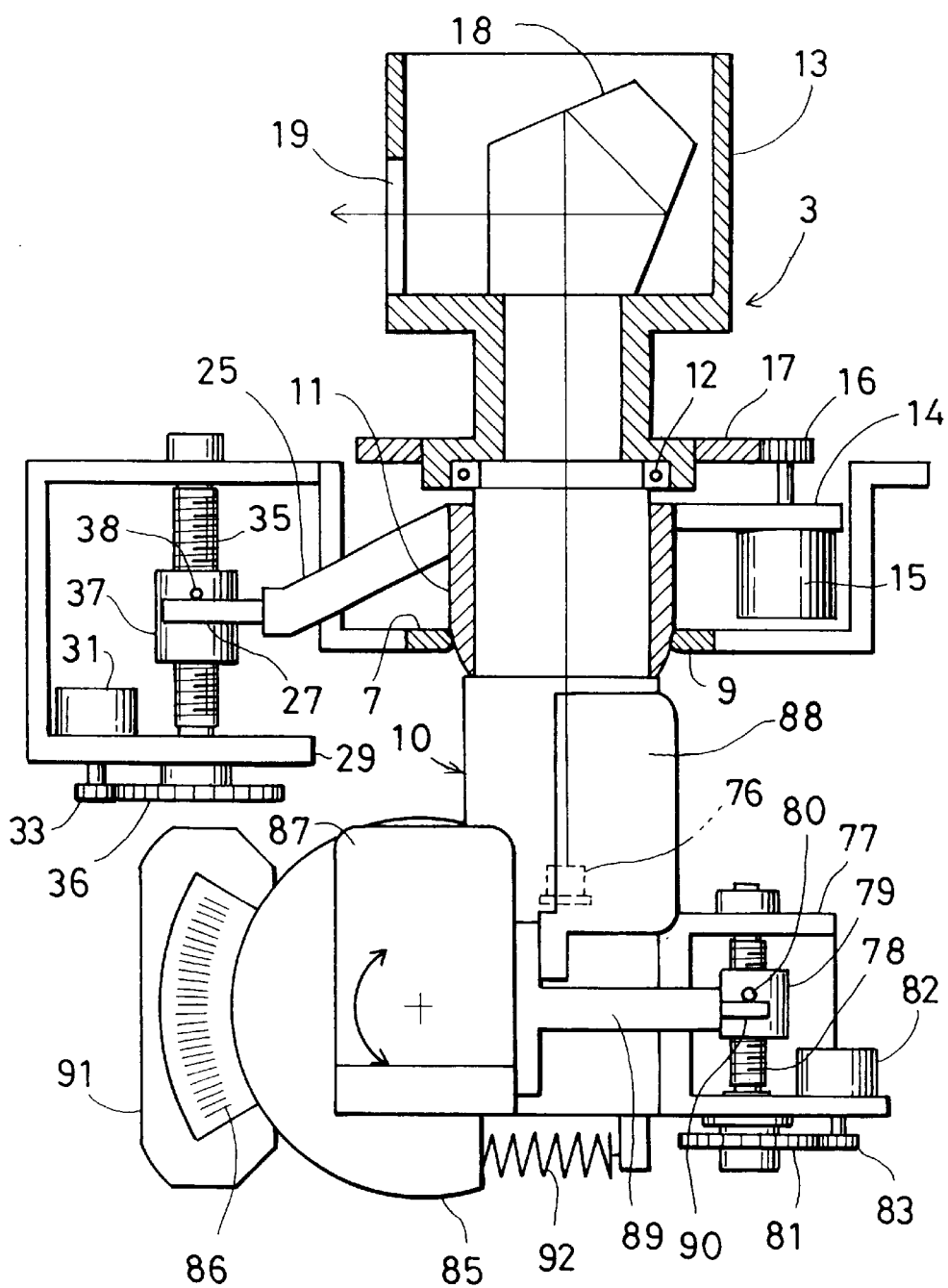
FIG. 1 is an elevation view showing a partial cross-section of an essential portion of an embodiment of the present invention.

Description will be given below on an embodiment of the present invention referring to the drawings.

Figure 2:
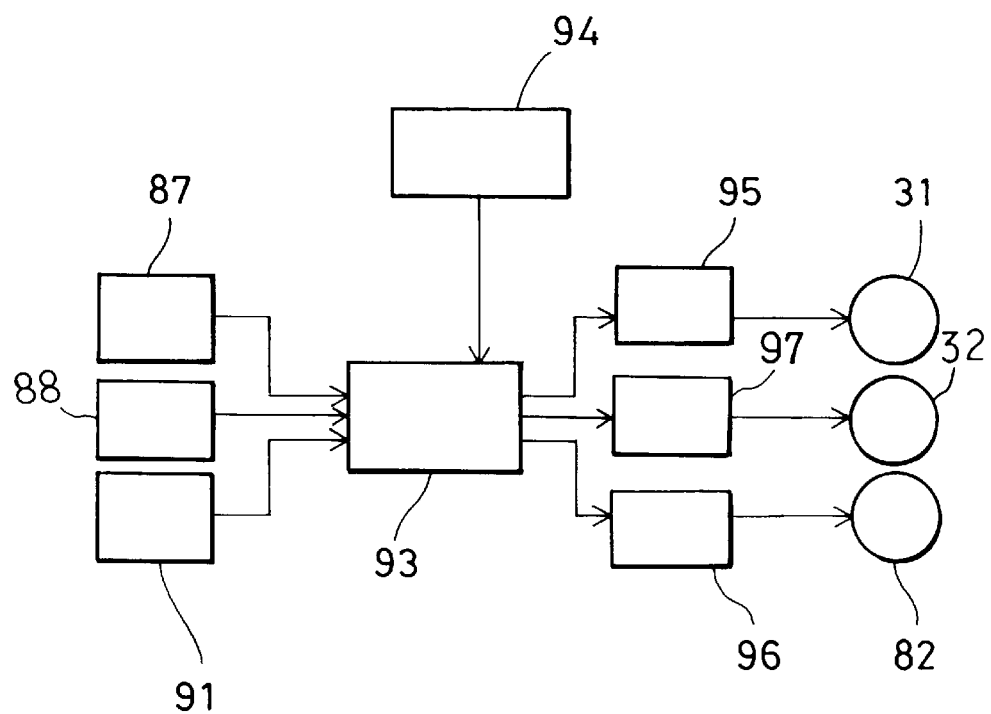
FIG. 2 is a control block diagram of the embodiment of the present invention.
Figure 5:
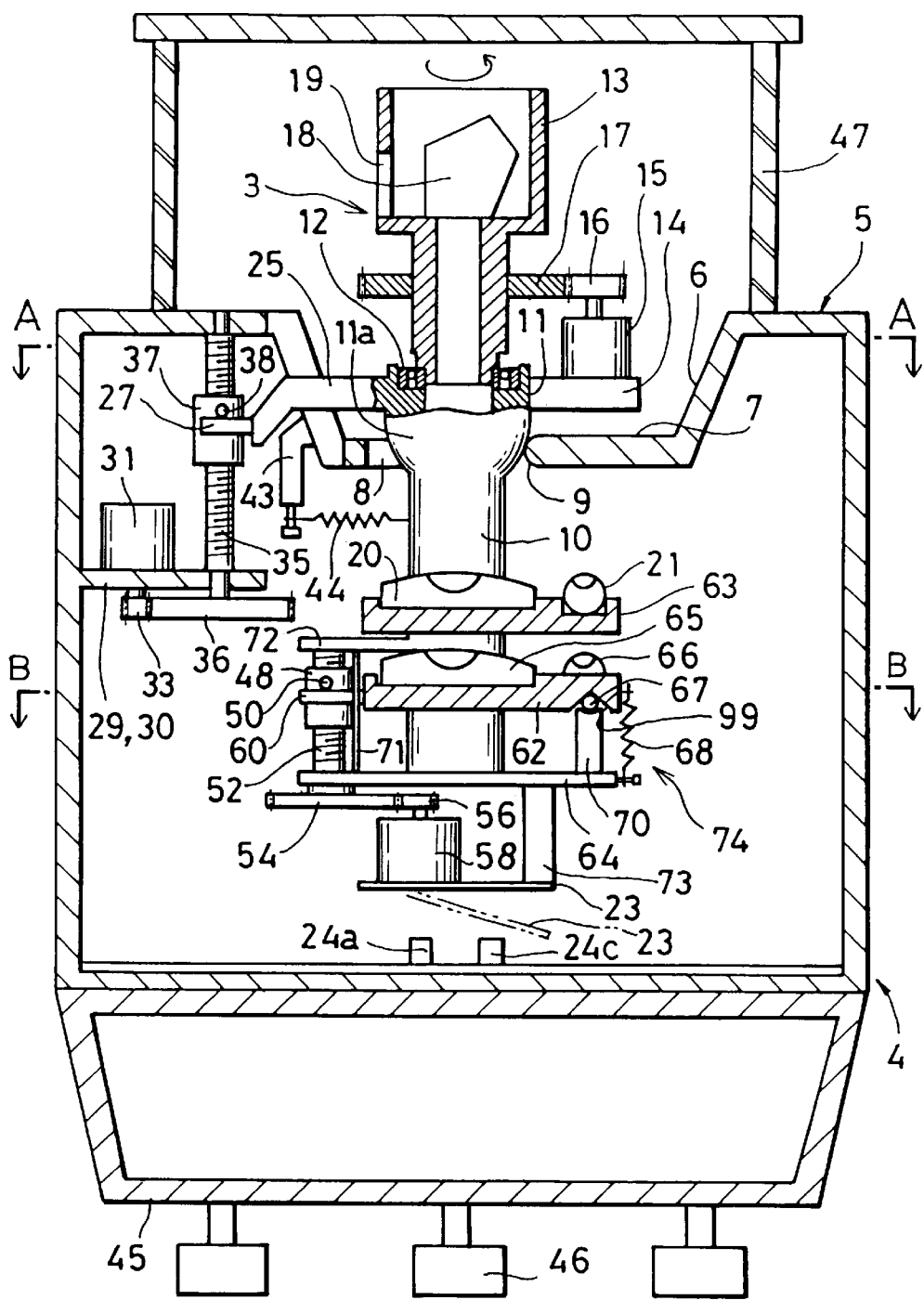
FIG. 5 is a cross-sectional elevation view of a conventional example.
Figure 6:
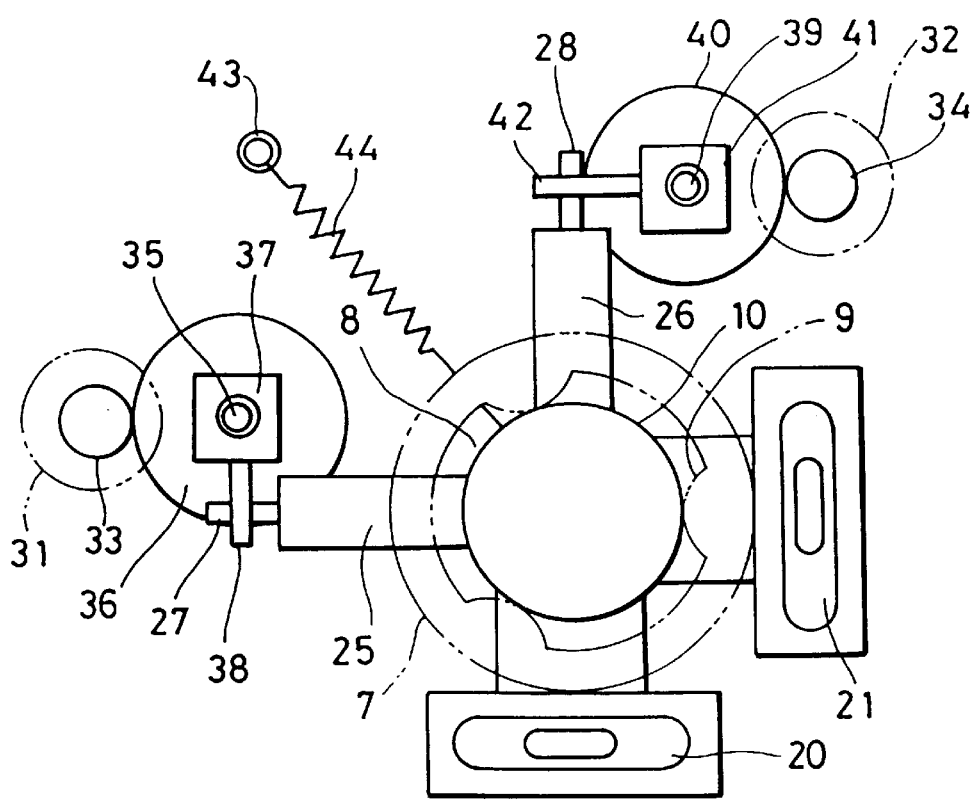
FIG. 6 is an arrow diagram along the line A—A in FIG. 5.
Figure 7:
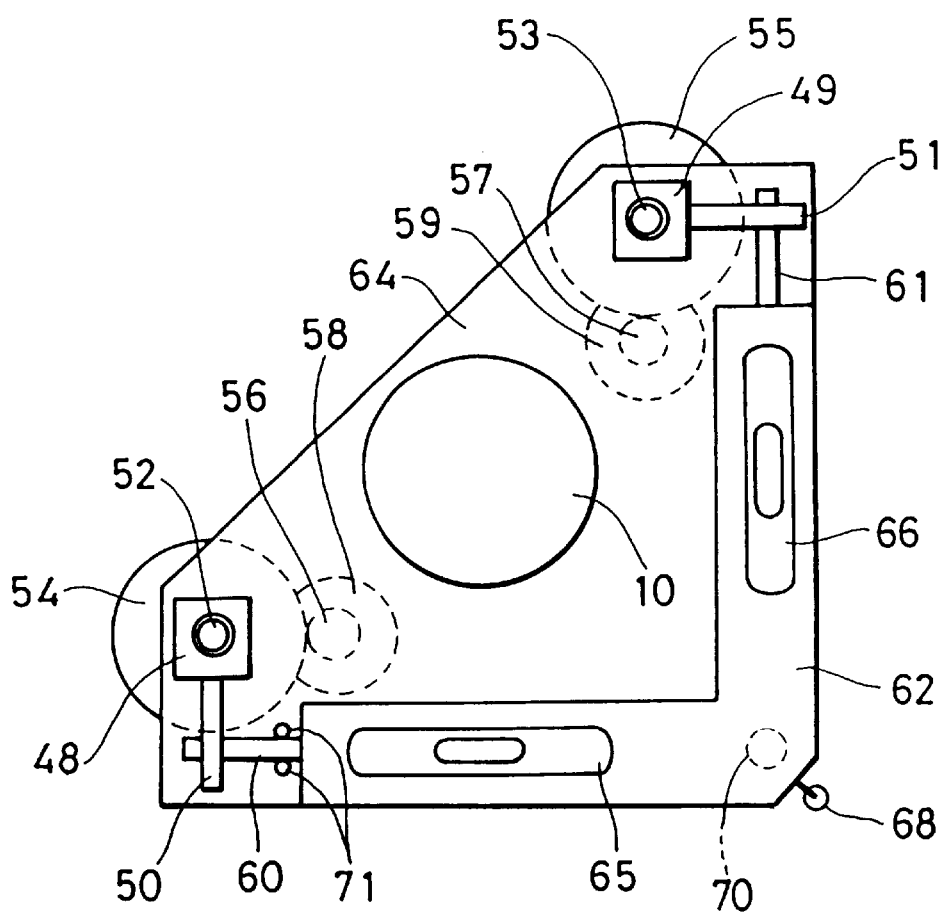
FIG. 7 is an arrow diagram along the line B—B in FIG. 5.
Figure 8:
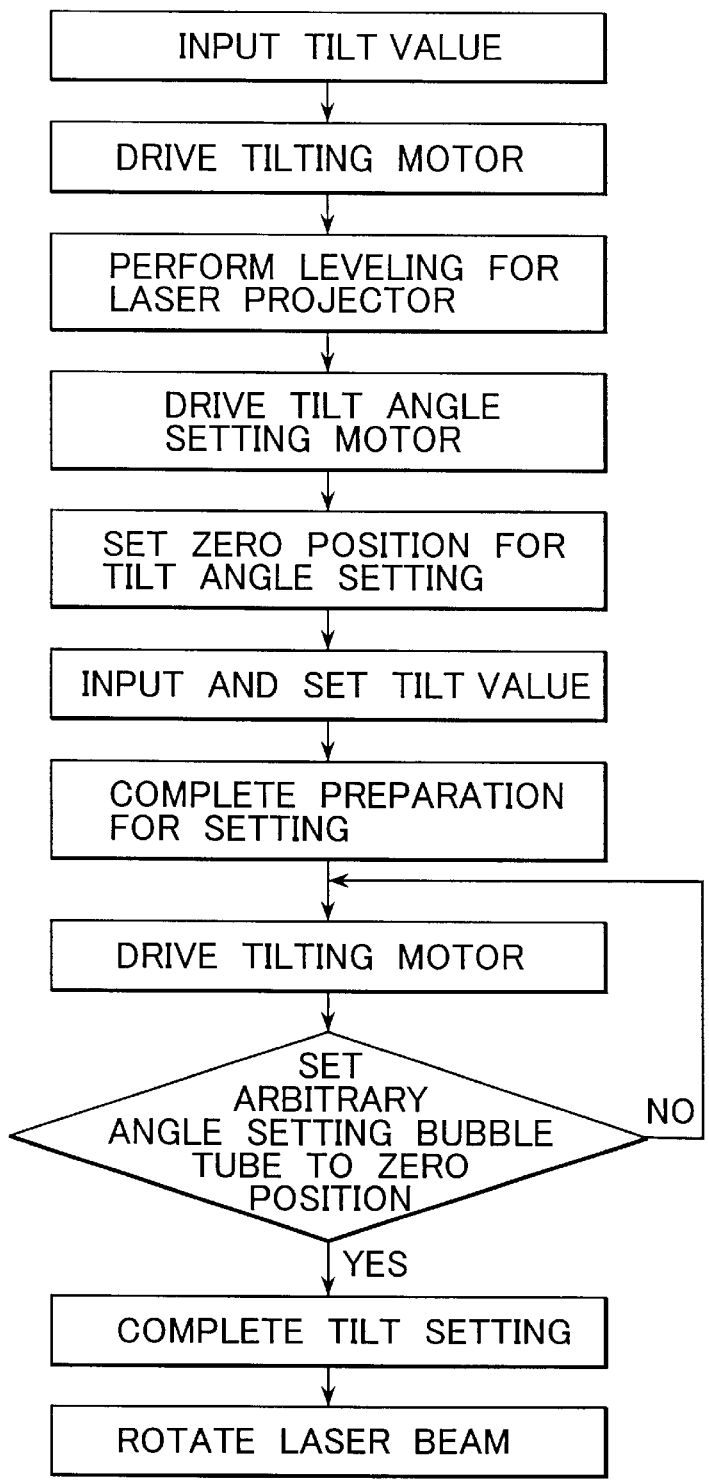
FIG. 8 is a flow chart of tilt setting operation in the conventional example.

FIG. 1 and FIG. 2 each represents an essential portion of an embodiment of the present invention. In FIG. 1, the same component as in FIG. 5 is referred by the same symbol.

Supporting structure of a laser projector 10 and mechanism of a tilting unit are basically the same as in the conventional example, and detailed description is not given here. In the following, description will be given on a tilt angle setting unit in the present embodiment.

A frame 77 is fixed on a laser projector 10. A tilt setting screw 78 in parallel to the axis of the laser projector 10 is rotatably mounted on the frame 77, and a setting driven gear 81 is engaged on the lower end which is protruding downward from the frame 77. A tilt setting nut 79 is screwed on the tilt setting screw 78. Rotation of the tilt setting nut 79 is restricted, and it can be moved only in the direction of the axis of the tilt setting screw 78. A power transmission pin 80 protruding in the horizontal direction is provided on the tilt setting nut 79, and it is brought into contact with a driven pin 90, which is to be described later. A tilt setting motor 82 is provided on the frame 77. A setting driving gear 83 is attached on an output shaft of the tilt setting motor 82, and the setting driving gear 83 is engaged with the setting driven gear 81.

A rotor 85 is provided, which has a rotation axis perpendicularly crossing the axis of the laser projector 10. An absolute encoder 86 is arranged on the rotor 85 so that the absolute encoder 86 is integrally rotated with the rotor 85. On the rotor 85, there are provided an X-axis (horizontal axis in parallel to paper surface) tilt sensor 87 and a Y-axis (horizontal axis perpendicular to paper surface) tilt sensor 88, and these are integrally rotated with the rotor 85. A CCD unit 91 is mounted on the laser projector 10, and an angle of the absolute encoder 86 can be read by the CCD unit 91. The CCD unit 91 and the absolute encoder 86 make up together an angle detector, and the angle detector detects an angle between the X-axis tilt sensor 87 and the laser projector 10. Under condition that the absolute encoder 86 detects an angle of 0, also under the condition that the X-axis tilt sensor 87 and the Y-axis tilt sensor 88 detect an angle of 0, the relationship of the laser projector 10 with the absolute encoder 86, the X-axis tilt sensor 87 and the Y-axis tilt sensor 88 is determined in such manner that the axis of the laser projector 10 is directed in the vertical direction. Here, the Y-axis tilt sensor 88 detects the horizontal position in Y-axis direction as adjusted by the tilt arm 26.

From the rotor 85, a tilt arm 89 is extended toward the tilt setting nut 79. At the forward end of the tilt arm 89, the driven pin 90 is arranged, and the driven pin 90 is brought into contact with the power transmission pin 80 from the below. A spring 92 is stretched between the rotor 85 and the laser projector 10, and the tilt arm 89 is pushed counterclockwise, and the driven pin 90 is pressed against the power transmission pin 80 with a predetermined force. The spring 92 pushes up the tilt setting nut 79 upward via the tilt arm 89, the driven pin 90 and the power transmission pin 80, and prevents backlash of the tilt setting nut 79 and the tilt setting screw 78.

In the figure, reference numeral 76 denotes a laser diode, which emits a laser beam.

FIG. 2 is a control block diagram. Reference numeral 93 denotes a control unit, which is typically represented by a CPU.

The results of the detection from the X-axis tilt sensor 87 and the Y-axis tilt sensor 88 are inputted to the control unit 93, and a detection angle of the absolute encoder 86, i.e. the result of angle detection from the CCD unit 91, is inputted. The control unit 93 is provided with a storage unit (not shown). In the storage unit, a sequence program for tilt angle setting and an arithmetic operation program necessary for tilt angle setting are set and inputted. The data necessary for tilt angle setting is inputted to the control unit 93 from an input unit 94.

Based on the data inputted from the X-axis tilt sensor 87, the Y-axis tilt sensor 88, and the CCD unit 91, the control unit 93 issues a control driving signal to tilting motor driving units 95 and 97 and to a tilt setting motor driving unit 96. The tilting motors 31 and 32 and the tilt setting motor 82 are driven via the tilting motor driving units 95 and 97 and via the tilt setting motor driving unit 96.

Figure 3:
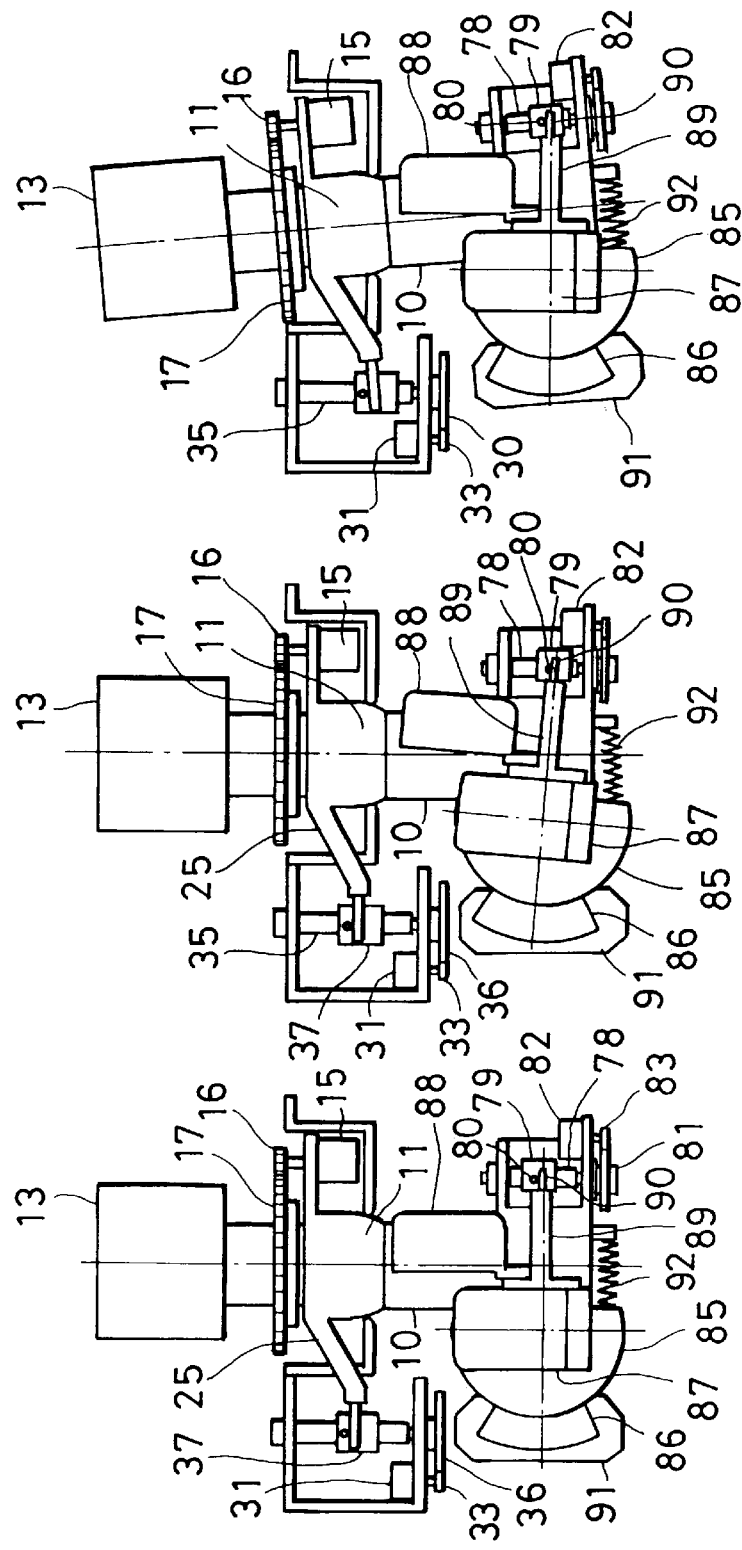
FIG. 3(A), FIG. 3(B) and FIG. 3(C) each represents a drawing to explain tilt setting operation of the embodiment of the present invention.
Figure 4:
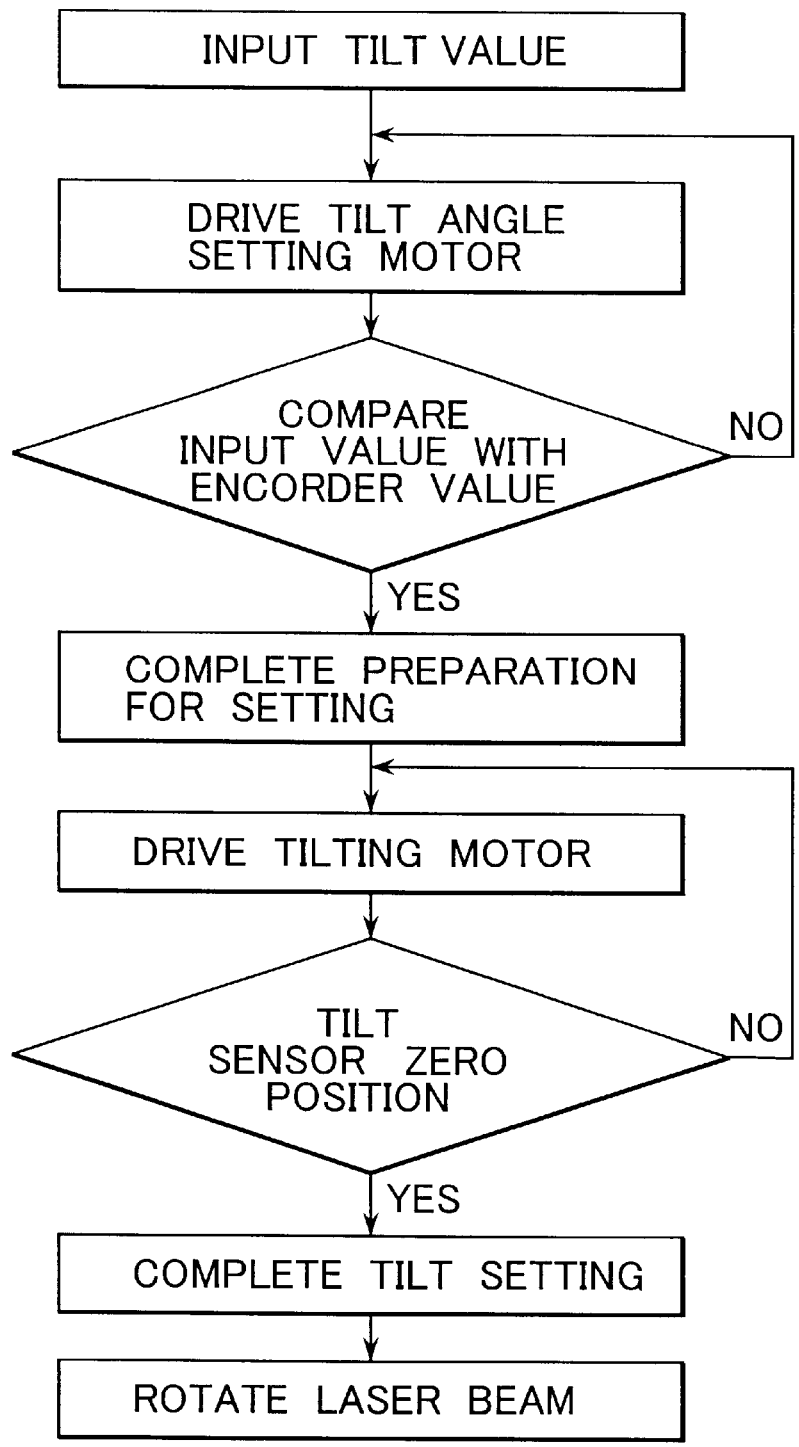
FIG. 4 is a flow chart of the tilt setting operation of the embodiment of the present invention.

Referring to FIG. 3 and FIG. 4, description will be given on operation of tilt setting.

A tilt angle as desired is inputted from the input unit 94.

The control unit 93 drives the tilt setting motor 82 via the tilt setting motor driving unit 96, and the tilt setting screw 78 is rotated. When the Y-axis tilt sensor 88 is not at the horizontal position, the tilting motor 32 is driven via the tilting motor driving unit 97 at the same time. By the rotation of the tilt setting screw 78, the tilt setting nut 79 is moved up or down. And the absolute encoder 86 is integrally rotated with the rotor 85 via the power transmission pin 80, the driven pin 90, and the tilt arm 89. The absolute encoder 86 detects a rotation angle and the rotation angle is turned to a signal by the CCD unit 91, and it is inputted to the control unit 93. In this case, when the Y-axis tilt sensor 88 detects the horizontal position, it is turned to tilt setting status, and driving of the tilting motor 32 is stopped.

At the control unit 93, the signal from the CCD unit 91 is compared with the preset value from the input unit 94. When these values are identical with each other, the tilt setting motor 82 is stopped.

Under this condition, the rotor 85 is rotated in opposite direction with respect to the laser projector 10 and at the same angle as the desired tilt angle. On the rotor 85, the X-axis tilt sensor 87 and the Y-axis tilt sensor 88 are fixed. The X-axis tilt sensor 87 is tilted together with the rotor 85 with respect to the laser projector 10. The Y-axis tilt sensor 88 is twisted only by the tilt angle, but there is no influence on the detection of the horizontal position in Y direction (See FIG. 3(B)).

Next, until the signal from the X-axis tilt sensor 87 is turned to 0, i.e. until the X-axis tilt sensor 87 detects the horizontal position, the control unit 93 issues a driving control signal to the tilt setting motor driving unit 96 and drives the tilting motor 31.

The signal from the X-axis tilt sensor 87 is inputted to the control unit 93. At the control unit 93, it is judged whether the input signal is 0 or not. If it is not 0, the driving of the tilting motor 31 is continued, and the tilting motor 31 is stopped when it is turned to 0. The X-axis tilt sensor 87 is tilted at the same angle as the desired tilt angle and is in the opposite direction with respect to the laser projector 10. Thus, the laser projector 10 is tilted at the desired tilt angle when the X-axis tilt sensor 87 detects the horizontal position. Thus, the setting of tilt angle is completed (See FIG. 3(C)).

When the scanning motor 15 is driven and the prism holder 13 is rotated via the gear 16 and the scanning gear 17, a laser beam is projected by rotary irradiation, and a laser reference plane tilted at a predetermined angle in a predetermined direction is formed.

When a new tilt angle is to be set, the above procedure is repeated.

The tilt setting procedure as described above is based on angle information of the absolute encoder 86. The absolute encoder 86 outputs an absolute angle between the laser projector 10 and the rotor 85, i.e. the X-axis tilt sensor 87. When a new setting angle is inputted, the new setting angle is compared with the detection angle of the absolute encoder 86, and it should be controlled in such manner that the detection angle of the absolute encoder 86 is equal to the setting angle. Thus, each time the tilt angle setting, there is no need to perform zero re-setting to the horizontal position for the laser projector 10 and the X-axis tilt sensor 87.

In the above embodiment, description has been given on the tilt setting in one direction, while it is needless to say that it is possible to tilt in any direction as desired when there are provided two sets of tilting mechanisms as in the conventional example. In this case, the Y-axis tilt sensor is set to a tilt setting mechanism in Y-axis direction.

According to the present invention, the tilt setting unit comprises a tilt sensor for detecting the horizontal position and an angle detector for detecting an angle between the tilt sensor and the projector. As a result, high accuracy is not necessarily required for the components of the tilt setting unit. This contributes to the reduction of the manufacturing cost. Because the actual tilt angle is detected, there is no error caused from mechanical problem. The actual angle is detected, and a tilt angle is set based on the result of detection. Therefore, there is no need to perform zero setting. The operation can be carried out quickly, and movement of the movable components is limited to the minimum movement necessary for the setting. Wearing of components is reduced, and the increase of cumulative errors over time can be prevented. Further, the number of the components can be reduced, and this leads to lower manufacturing cost and simpler assembling and adjusting procedure. As a result, the time required for assembling and adjustment can be extensively shortened.

What is claimed is:

1. A laser survey instrument, comprising a laser projector for projecting a laser beam onto a plane by rotary irradiation, a tilt setting unit provided on said laser projector and being tiltable with respect thereto, said tilt setting unit being adapted to set a desired tilt angle for said laser projector, and a tilting unit for tilting said laser projector in response to a desired tilt angle set by said tilt setting unit, wherein said tilt setting unit comprises an angle detector for detecting an angle between said tilt setting unit and said laser projector, and a tilt sensor which tilts integrally with said angle detector and which detects a horizontal position, wherein said angle detector comprises an absolute encoder and a CCD unit for reading an angle of said absolute encoder, wherein said laser projector is set at a predetermined angle when said angle detector detects the predetermined angle and when said tilting sensor detects a signal of zero, whereupon said laser projector projects said laser beam onto a plane of said predetermined angle.

2. A laser survey instrument according to claim 1, wherein the tilting unit is adapted to tilt the laser projector in two directions running perpendicularly to each other and the tilt setting unit is provided so as to set tilting with respect to one of said two directions.

* * * * *